US005594286A

United States Patent [19]

Tachikawa

[11] Patent Number: 5,594,286
[45] Date of Patent: Jan. 14, 1997

[54] POWER CONTROL SYSTEM FOR ELECTRICAL POWER SUPPLY MODULES

[75] Inventor: Hiroshi Tachikawa, Yamanashi, Japan

[73] Assignee: NEC Corporation, Tokyo, Japan

[21] Appl. No.: 85,037

[22] Filed: Jul. 2, 1993

[30] Foreign Application Priority Data

Jul. 2, 1992 [JP] Japan ................... 4-197436

[51] Int. Cl.$^6$ ........................................ H02J 1/00
[52] U.S. Cl. ....................... 307/43; 307/72; 364/492
[58] Field of Search ........................... 307/52, 53, 43, 307/64, 65, 66, 85–87, 44, 72; 323/268, 272; 363/65, 71; 364/492, 493

[56] References Cited

U.S. PATENT DOCUMENTS

| | | | |
|---|---|---|---|
| 4,128,771 | 12/1978 | Domenico | 307/52 |
| 4,451,773 | 5/1984 | Papathomas et al. | 320/59 |
| 4,633,412 | 12/1986 | Ebert, Jr. et al. | 364/493 |
| 4,677,535 | 6/1987 | Kawabata et al. | 363/65 |
| 4,845,637 | 7/1989 | Basarath et al. | 364/492 |
| 4,924,170 | 5/1990 | Henze | 323/272 |

*Primary Examiner*—William M. Shoop, Jr.
*Assistant Examiner*—Jonathan S. Kaplan
*Attorney, Agent, or Firm*—Sughrue, Mion, Zinn, Macpeak & Seas

[57] ABSTRACT

A control circuit for controlling a plurality of power supply modules connected in parallel to provide power to a single load. The control module first converts first analog data corresponding to a voltage level which is applied to the load. The control module then compares the voltage level to a predetermined voltage level and computes a voltage deviation between the predetermined voltage level and the voltage applied to the load. The control module then computes whether the voltage deviation is within a proper limit or not. The control module then sends a pulse width data signal corresponding to the voltage deviation to the power supply modules in order to control the amount of power each module supplies to the load.

6 Claims, 3 Drawing Sheets

1

POWER CONTROL SYSTEM FOR ELECTRICAL POWER SUPPLY MODULES

BACKGROUND OF THE INVENTION

The present invention relates to a power control system for data processing apparatuses or the like, and more particularly to a power control system for balancing the output currents and stabilizing the output voltages of a plurality of switching power supply modules.

Power control systems of this kind according to the prior include what is disclosed in the U.S. Pat. No. 4,924,170. Each of the power supply modules disclosed therein comprises converter means for detecting an amperage supplied to each connected load and converting into a preset corresponding voltage; a comparator means for comparing the voltage from the converting means with a predetermined reference voltage; and pulse width changing means for supplying a power switch with a control signal to enlarge the pulse width when the comparator means determines the voltage from the converting means to be lower than the reference voltage, and supplying the power switch with a control signal to narrow the pulse width when the comparator means determines the voltage from the converting means to be higher than the reference voltage.

This prior art power supply module, however, involves the following problems.

First, since the output amperages from different loads are not in a perfect equilibrium, usually large currents are supplied to some of the loads all the time, with the result that the loads themselves are heavily burdened and deteriorated in reliability.

Furthermore, even if said means is operated to balance the output currents from the loads, it takes time to control the output currents from the loads because the output impedance of each load is extremely small at an amperage below the rated output current, and the output current from the output voltage from each load after adjustment is unstable.

SUMMARY OF THE INVENTION

A principal object of the present invention is to obviate the above-mentioned disadvantages and provide a power control system for simultaneously and precisely accomplishing the balancing and stabilization of output currents from a plurality of switching power supply modules connected in parallel and the stabilization of output voltages therefrom.

According to the invention, there is provided a power control system equipped with first processing means for converting first analog data supplied from a plurality of switching power supply modules; second processing means for comparing said digital data, converted by said first processing means, with predetermined reference voltage data and computing voltage deviations; third processing means for judging whether or not said voltage deviations computed by said second processing means are within a permissible extent; fourth processing means for adding said voltage deviations to, or subtracting them from, predetermined reference pulse width data if said voltage deviations are judged to be beyond the permissible extent; and fifth processing means for supplying each switching power supply module with the result of arithmetic operation by said fourth processing means as first pulse width data.

BRIEF DESCRIPTION OF THE DRAWINGS

The features and advantages of the present invention will become more apparent from the following detailed description when taken in conjunction with the accompanying drawings, wherein.

In these drawings, the same reference numerals denote respectively the same constituent elements.

DETAILED DESCRIPTION OF THE PREFERRED EMBODIMENT

Next will be described in detail a preferred embodiment of the present invention with reference to drawings.

Figure 1:
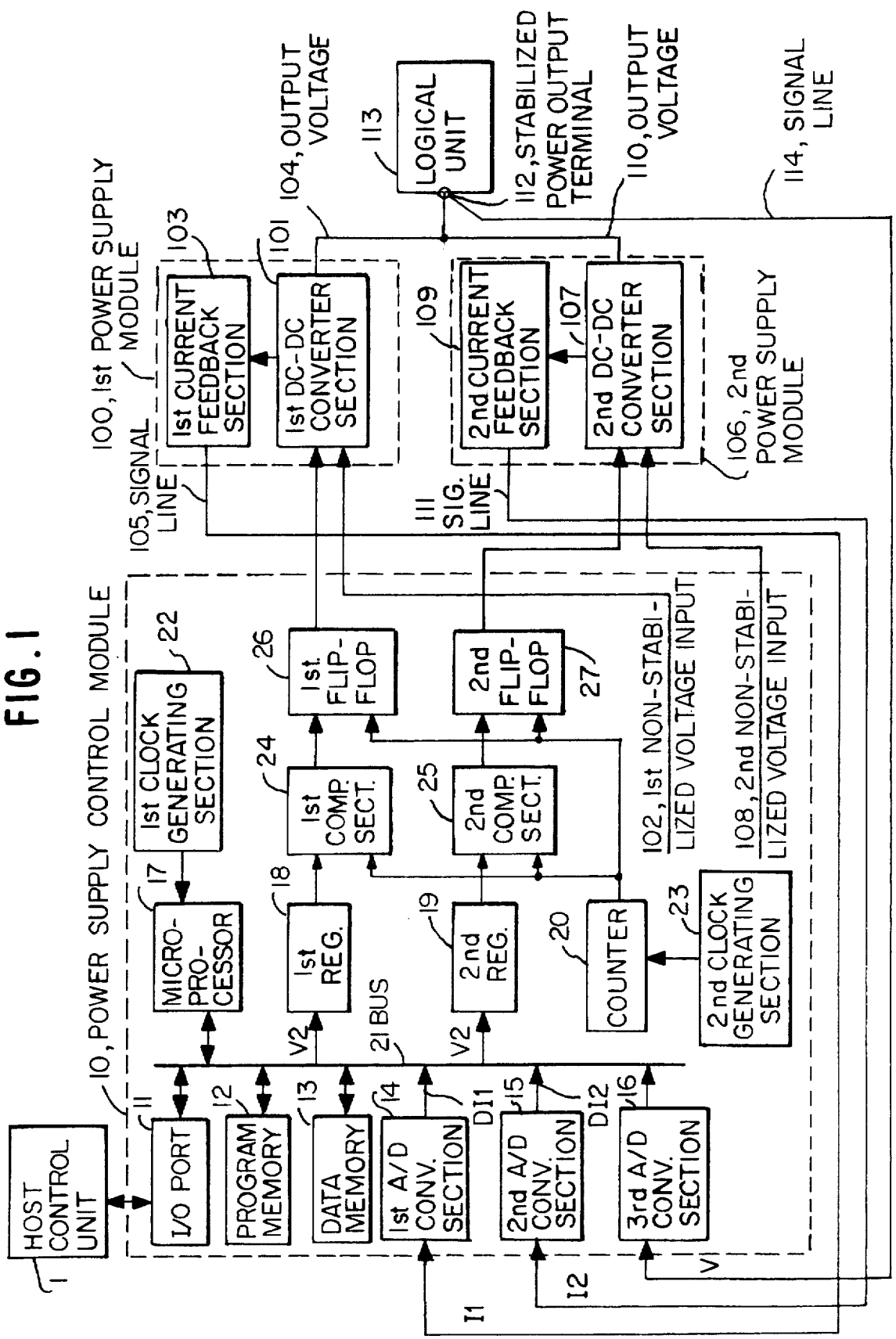
FIG. 1 is a block diagram of a preferred embodiment of the invention.

Referring to FIG. 1, the preferred embodiment of the invention consists of a host control unit 1, a power supply control module 10, a first switching power supply module 100, a second switching power supply module 106, and a logical unit 113.

The host control unit 1 is connected to the power supply control module 10 via an interface circuit (not shown).

The first switching power supply module 100 and the second switching power supply module 106 are respectively provided with a first current feedback section 103 and a second current feedback section 109, and with a first DC-to-DC converter section 101 and a second DC-to-DC converter section 107.

The power supply control module 10 consists of an input/output (I/O) port 11; a program memory 12; a data memory 13 for storing predetermined reference voltage data; a first analog-to-digital (A/D) converter section 14 for converting second analog data I1 related to a first output current 104, received from the first current feedback section 103 of the first switching power supply module 100 via a signal line 105, into digital data DI1; a second A/D converter section 15 for converting second analog data I2 related to a second output current 110, received from the second current feedback section 109 of the second switching power supply module 106 via a signal line 111, into digital data DI2; a third A/D converter section 16 for receiving first analog data V, related to a stabilized power output voltage generated by parallel feeding of the first stabilized output voltage 104 of the first switching power supply module 100 and the second stabilized output voltage 110 of the second switching power supply module 106, via a signal line 114, and converting the first analog data V into digital data DV; a microprocessor 17 for controlling each section to perform processing to balance or stabilize its output current or output voltage; a first register 18 for storing second pulse width data V2 generated corresponding to the second analog data I1; a second register 19 for storing second pulse width data V2 generated corresponding to the second analog data I2; a counter 20 for counting the output pulses from a second clock generating section 23 and outputting the count; a bus 21 connecting the I/O port 11, program memory 12, data memory 13; first A/D converter section 14, second A/D converter section 15, third A/D converter section 16, microprocessor 17, first register 18 and second register 19; a first clock generating section 22; the second clock generator section 23 for supplying pulses having the minimum sufficient pulse width for allowing the first switching power supply module 100 and the second switching power supply module 106 to perform control to stabilize the output voltages; a first comparator section 24 for comparing the second pulse width data V2, stored in the first register 18, with the output value of the counter 20 and, if they are found identical, supplying an identity signal; a second comparator section 25 for comparing the second pulse width data V2, stored in the second register 19, with the output value of the counter 20 and, if they are found identical, supplying an identity signal; a first flip-flop (F/F) 26 which is set in accordance with the identity signal supplied from the first comparator section 24 to supply first DC drive pulses and reset in accordance with an overflow signal of the counter 20; and a second F/F 27 which is set in accordance with the identity signal supplied from the second comparator section 25 to supply second DC drive pulses and reset in accordance with an overflow signal of the counter 20.

The first switching power supply module 100 is provided with the first DC-to-DC converter section 101 for receiving first DC drive pulses to perform pulse width control to stabilize the output voltage or output current, a first non-stabilized voltage input 102, and the first current feedback section 103.

The second switching power supply module 106 is provided with the second DC-to-DC converter section 107 for receiving second DC drive pulses to perform pulse width control to stabilize the output voltage or output current, a second non-stabilized voltage input 108, and the second current feedback section 109.

The logical unit 113 is provided with a stabilized power output terminal 112 to which is fed a stabilized power output voltage generated by parallel feeding of the first stabilized output voltage 104 of the first switching power supply module 100 and the second stabilized output voltage 110 of the second switching power supply module 106.

Next will be described the operation of this preferred embodiment with reference to FIGS. 1 through 3.

Figure 2:
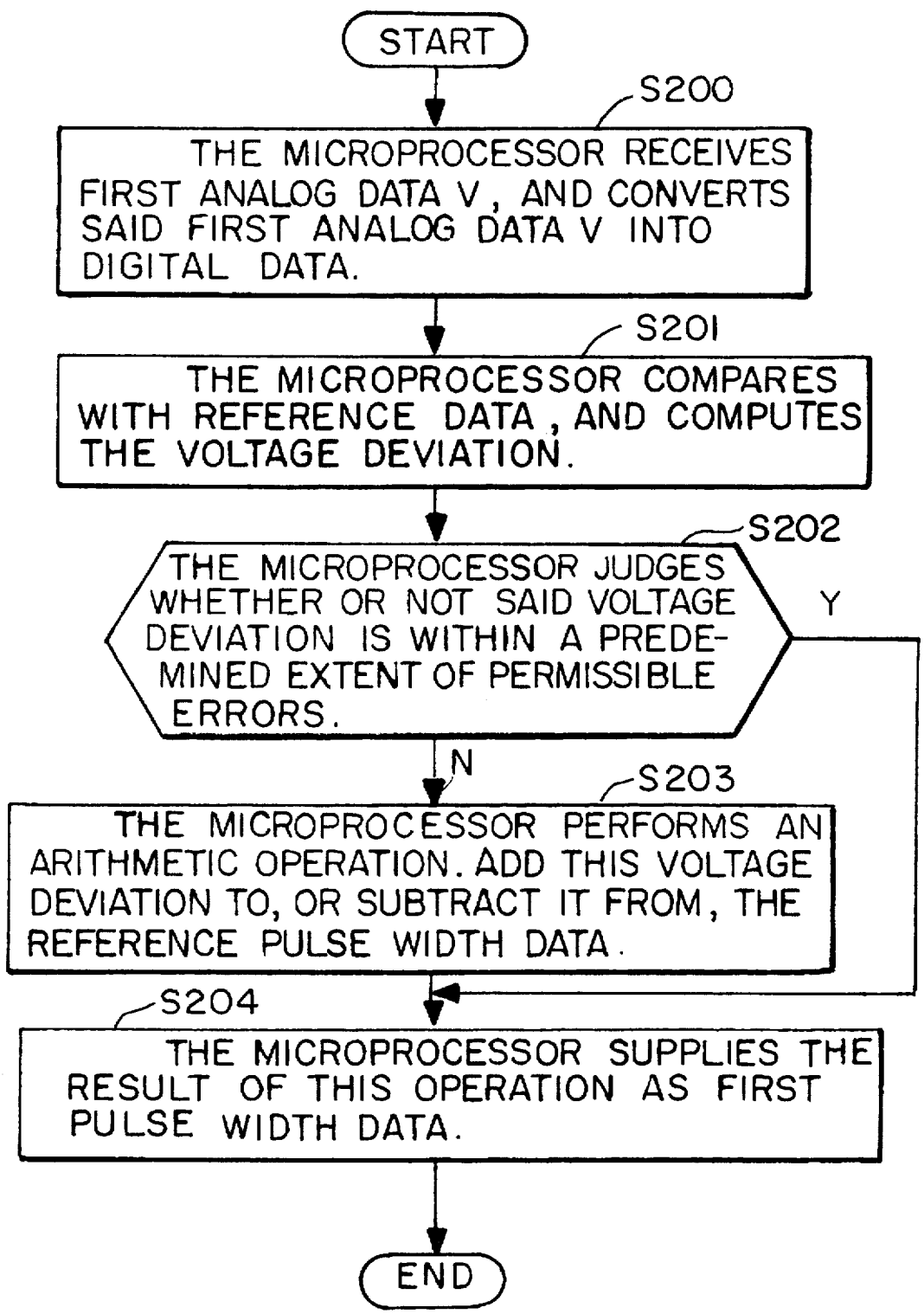
FIG. 2 is a flow chart showing the output voltage control processing in this preferred embodiment.

First, the microprocessor 17 of the power supply control module 10 receives via the signal line 114 first analog data V, related to a stabilized power output voltage generated by parallel feeding of the first stabilized output voltage 104 supplied from the first DC-to-DC converter section 101 of the first switching power supply module 100 to the logical unit 113 and the second stabilized output voltage 110 supplied from the second DC-to-DC converter section 107 of the second switching power supply module 106 to the logical unit 113, and converts the first analog data V into digital data (FIG. 2, step S200).

Then, the microprocessor 17 of the power supply control module 10 compares, using the third A/D converter section 16, the digital data converted from the first analog data V with reference data stored in advance in the data memory 13, and computes the voltage deviation between them (FIG. 2, step S201).

The microprocessor 17 of the power supply control module 10 further judges whether or not this voltage deviation is within a predetermined extent of permissible errors (FIG. 2, step S202).

At this time, the microprocessor 17 of the power supply control module 10, if it judges that the voltage deviation is beyond the predetermined extent of permissible errors, reads out reference pulse width data stored in advance in the data memory 13, performs an arithmetic operation add this voltage deviation to, or subtract it from, the reference pulse width data (FIG. 2, step S203), and generates the results of this operation as first pulse width data (FIG. 2, step S204).

Figure 3:
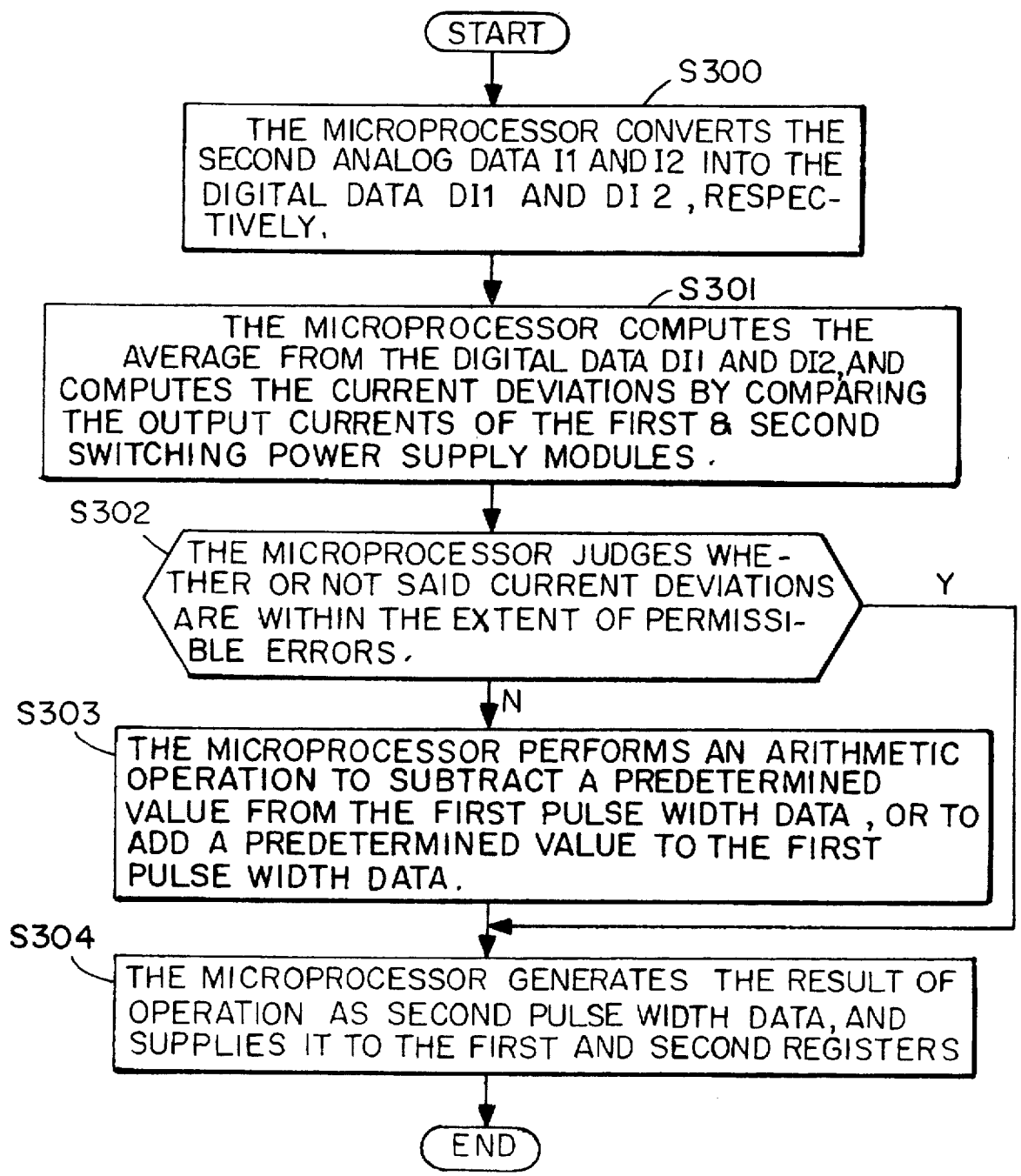
FIG. 3 is a flow chart showing the output current control processing in this preferred embodiment.

Next, the microprocessor 17 of the power supply control module 10 receives at predetermined intervals the second analog data I1 related to the first stabilized output voltage 104 supplied from the first switching power supply module 100 and the second analog data I2 related to the second stabilized output voltage 110 supplied from the second switching power supply module 106 via the signal lines 105 and 111, respectively, and convert them into the digital data DI1 and DI2 with the first A/D converter section 14 and the second A/D converter section 15, respectively (FIG. 3, step S300).

Then, the microprocessor 17 of the power supply control module 10 computes the average from the digital data DI1 and DI2, and figures out current deviations by comparing the output currents of the first switching power supply module 100 and the second switching power supply module 106 with this average (FIG. 3, step S301).

The microprocessor 17 of the power supply control module 10 further compares the current deviations with the digital data, and judges whether or not they are within the extent of permissible errors (FIG. 3, step S302).

Thus, if the digital data is greater by the average by 1[A] or more, it will perform an arithmetic operation to subtract 1 unit from the first pulse width data, or if the average is greater than the digital data by 1[A] or more, it will perform an operation to add 1 unit to the first pulse width data (FIG. 3, step S303), generates the result of operation as second pulse width data, and supplies it to the first register 18 or the second register 19 (FIG. 3, step S304).

The second pulse width data stored in the first register 18 and the second register 19 are supplied, respectively via the first comparator section 24 and the second comparator section 25 and via the first F/F 26 and the second F/F 27, to the first switching power supply module 100 and the second switching power supply module 106 as first DC drive pulse and second DC drive pulse, respectively.

By repeating the above-described series of operations, control is accomplished by the arithmetic processing by the microprocessor 17 so as to balance the output current of the first switching power supply module 100 and that of the second switching power supply module 106 in a stable state.

Accordingly, the balancing and stabilization of the output currents of a plurality of switching power supply modules connected in parallel and the stabilization of their output voltages can be achieved simultaneously at high precision.

While the present invention has been described with reference to the preferred embodiment thereof, it will now be readily possible for persons skilled in the art to put this invention into practice in various other manners.

What is claimed is:

1. A power control system equipped with a host control unit, a power supply control module, a plurality of switching power supply modules whose stabilized power output terminals connected to each other in parallel, and a logical unit, wherein said power supply control module comprises:

first processing means for converting first analog data corresponding to a voltage level, supplied for the logical unit from a plurality of switching power supply modules connected in parallel into digital data;

second processing means for comparing said digital data, converted by said first processing means, with predetermined reference voltage data and computing a voltage deviation between said digital data and said predetermined reference voltage data;

third processing means for judging whether or not said voltage deviation computed by said second processing means is within a permissible extent;

fourth processing means for performing an arithmetic operation with said voltage deviation and a stored reference pulse width data when said voltage deviation is judged to be beyond the predetermined permissible extent; and fifth processing means for supplying each of said switching power supply modules with the result of said arithmetic operation by said fourth processing means as first pulse width data.

2. A power control system, as claimed in claim 1, wherein said power supply control module further comprises:

sixth processing means for converting second analog data, supplied from a plurality of switching power supply modules, into a second digital data;

seventh processing means for computing an average from said second digital data, and figuring out a second deviation by comparing the output current from each of said switching power supply modules with said average;

eighth processing means for judging whether or not said second deviation is within a second predetermined permissible extent;

ninth processing means for performing a second arithmetic operation with a predetermined unit of value corresponding to said deviation and said first pulse width data when said third processing means judges that said second deviation is beyond the second predetermined permissible extent; and tenth processing means for supplying the result of said second arithmetic operation to each of said switching power supply modules as a second pulse width data.

3. A method for using a controller to control the output of a plurality of power supply modules, comprising the steps of:

sending a signal to the controller, said signal corresponding to the voltage supplied by said power supply modules;

comparing said signal to a predetermined reference voltage and computing a deviation between said signal and said reference voltage;

determining whether said deviation is within a predetermined allowable range;

performing an arithmetic operation with said deviation and a stored pulse width reference to thereby produce pulse width data when said deviation is without said predetermined allowable range;

sending said pulse width data to each of said power supply modules to thereby control the output of each of said power supply modules.

4. The method for using a controller to control the output of a plurality of power supply modules as claimed in claim 3, further comprising the steps of:

sending at least a second and a third signals to the controller;

computing an average of at least said second and third signals;

computing a difference between each of the second and third signals and said average;

determining whether said difference is within a reference difference;

performing an arithmetic operation with a signal corresponding to said difference, and the stored pulse width reference, to thereby produce a modified pulse width data when said difference is without said reference difference;

sending said modified pulse width data to each of said power supply modules to thereby control the output of each of said power supply modules.

5. A controller for controlling the output of a plurality of power supply modules, said controller comprising a microprocessor receiving a signal corresponding to the voltage supplied by said power supply modules, said microprocessor being preprogrammed to perform the steps of:

comparing said signal to a predetermined reference voltage and computing a deviation between said signal and said reference voltage;

determining whether said deviation is within a predetermined allowable range;

performing an arithmetic operation with said deviation and a stored pulse width reference to thereby produce pulse width data when said deviation is without said predetermined allowable range;

sending said pulse width data to each of said power supply modules to thereby control the output of each of said power supply modules.

6. The controller of claim 5, wherein said microprocessor further receives at least a second and third signals from said modules, and wherein said microprocessor is further preprogrammed to perform the steps of:

computing an average of at least said second and third signals;

computing a difference between each of the second and third signals and said average;

determining whether said difference is within a reference difference;

performing an arithmetic operation with a signal corresponding to said difference, and the stored pulse width reference, to thereby produce a modified pulse width data when said difference is without said reference difference;

sending said modified pulse width data to each of said power supply modules to thereby control the output of each of said power supply modules.

\* \* \* \* \*

UNITED STATES PATENT AND TRADEMARK OFFICE
CERTIFICATE OF CORRECTION

PATENT NO. : 5,594,286
DATED : January 14, 1997
INVENTOR(S) : Hiroshi TACHIKAWA

It is certified that error(s) appears in the above-identified patent and that said Letters Patent is hereby corrected as shown below:

Column 4, line 49, after "unit", delete "," and insert --connected to a--;

line 51, before "connected" insert --are--;

line 58, delete "converted" and insert --provided--.

Column 5, line 12, after "data," insert --corresponding to a current level--;

line 14, delete "a";

line 15, delete "from" and insert --of--;

line 16, delete "figuring out a" and insert --determining--;

line 17, delete "the output current" and insert --said second digital data--;

line 32, delete "the" and insert --an--.

Column 6, line 17, delete "the" and insert --an--.

Signed and Sealed this

Twelfth Day of August, 1997

Attest:

Attesting Officer

BRUCE LEHMAN

Commissioner of Patents and Trademarks